United States Patent [19]
McGinley et al.

[11] 3,814,239
[45] June 4, 1974

[54] TREE ROOT CONTAINER
[75] Inventors: Patrick McGinley, Geigertown; Santo J. Formica, King of Prussia, both of Pa.
[73] Assignee: Container Corporation of America, Chicago, Ill.
[22] Filed: May 15, 1972
[21] Appl. No.: 253,112

[52] U.S. Cl............ 206/423, 47/37, 229/40, 229/87 P
[51] Int. Cl..... A01g 23/04, B65d 5/02, B65d 85/52
[58] Field of Search............ 206/46 PL, 83.5; 47/37; 150/52 R, 11; 229/87 P

[56] References Cited
UNITED STATES PATENTS
797,175   8/1905   Collenburg et al............ 47/37 UX
1,200,396 10/1916  Southard................. 47/37
1,439,426 12/1922  Lemke................... 47/37 UX
2,150,453  3/1939  Mulford et al........... 206/46 PL
3,550,318 12/1970  Remke et al............. 47/37
3,550,662 12/1970  Remke.................. 150/11
3,634,970  1/1972  Williams............... 47/37

FOREIGN PATENTS OR APPLICATIONS
106,201  12/1942  Sweden................. 206/46 PL Primary Examiner—William I. Price
Assistant Examiner—Bruce H. Bernstein
Attorney, Agent, or Firm—Carpenter, Ostis & Lindberg

[57] ABSTRACT
A collapsible, inverted, generally frusto-conical container, formed from a unitary blank of paperboard, for enclosing a tree root ball to facilitate transplanting.

2 Claims, 3 Drawing Figures

TREE ROOT CONTAINER

It is an object of this invention to provide a relatively inexpensive container, for enclosing a tree root ball, which is easy to erect and apply to the tree root ball.

Another object is to provide a tree root container especially suitable for enclosing tree root balls which are conically shaped because of their removal by a VERMEER type tree extractor.

A more specific object is the provision, in a container of the type described, of a generally conically shaped, sleeve-like body formed of paperboard and having closure flaps at the upper and lower ends.

These and other objects of the invention will be apparent from an examination of the following description and drawings, wherein.

It will be understood that, for purposes of clarity, certain elements may have been intentionally omitted from certain views where they are believed to be illustrated to better advantage in other views.

Figure 1:
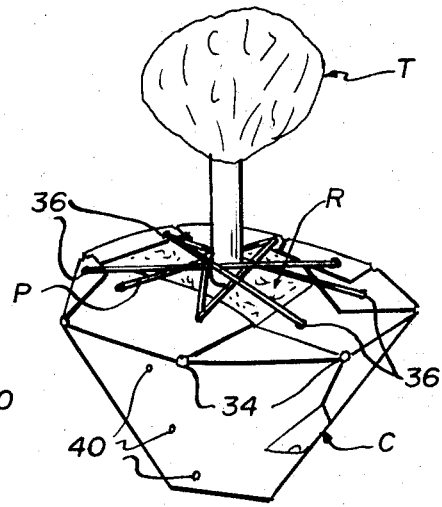
FIG. 1 is a perspective view of a tree root container embodying features of the invention, as seen in the fully erected condition enclosing the root ball of a tree.

Turning now to the drawing for a better understanding of the invention, and particularly to FIG. 1, it will be seen that the tree root container, indicated generally at C, is shown in a fully erected position secured around and enclosing the root ball R of a tree T.

Figure 3:
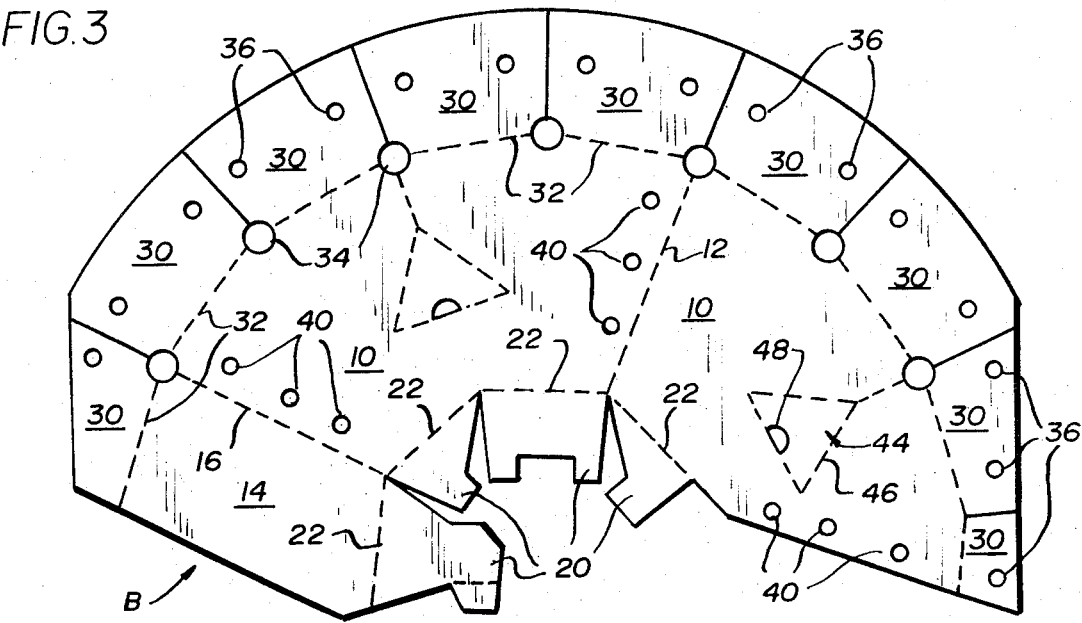
FIG. 3 is a plan view of the blank from which the container illustrated in the other views may be formed.
Figure 2:
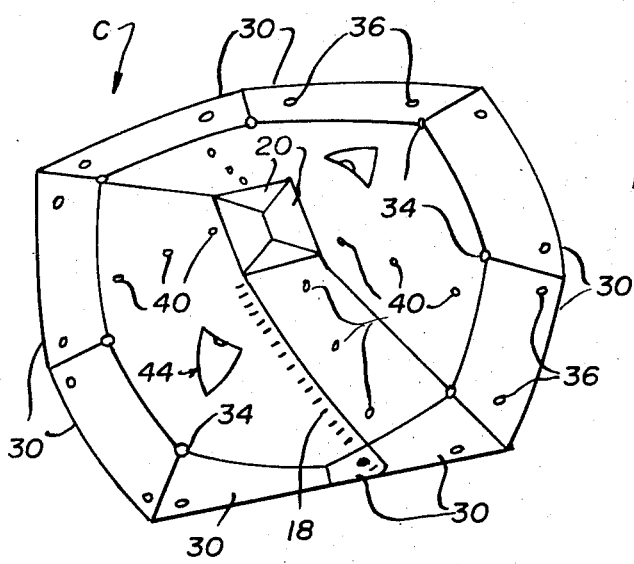
FIG. 2 is a perspective view of the container illustrated in FIG. 1, as seen from the bottom.

Now turning to FIGS. 2 and 3, it will be seen that the novel container, indicated at C in FIG. 2 of the drawings, may be formed from a flat blank of foldable paperboard, indicated at B in FIG. 3 of the drawings. The container when assembled is in the form of an inverted generally frusto-conical body formed from a plurality of generally wedge-shaped sections 10 which are hingedly interconnected along one or more fold lines 12. The body includes an additional section 14, hingedly attached to one of the wedge-shaped sections 10 along hinge line 16, which serves as a connecting flap positioned to overlie the section 10 at the other end of the blank and secured thereto in any desired manner, such as by staples 18.

Closure of the bottom end of the container is achieved by a plurality of closure flaps 20 hingedly attached along fold lines 22 to lower edges of the sections of the container body and disposed to be folded into overlapping interlocking connection, as best seen in FIG. 2.

The container is particularly suitable for use in enclosing a tree root ball which is generally conical in shape, as formed by a VERMEER type of tree root extractor which has a plurality of blades forming the tree root ball into the shape of an inverted cone.

To package a tree root ball, the container is slipped over the blades of the tree extractor, and as the extractor is withdrawn, the tree root ball is deposited within the container. The container is held in position around the tree root ball by a plurality of upper or top closure flaps 30 which are hingedly connected along a plurality of fold lines 32 to the upper edges of the container body sections. It will be noted that blank B is provided with a plurality of holes 34 at the corners of the top closure flaps 30 to facilitate die cutting of the blank and formation and folding of the closure flaps.

After the tree root ball has been deposited within the container, upper closure flaps 30 are folded inwardly so as to partially enclose the upper end of the container and prevent the accidental removal of the container from the tree root ball when the tree root ball is moved. It will be noted that the closure flaps 30 are provided with a plurality of holes 36 which are adapted to receive a flexible strand or rope indicated generally at P in FIG. 1, which is threaded through holes 34 and tied to secure the container in place. After this has been done, the tree root ball and container can be moved about without danger of accidental removal.

In order to facilitate the passage of air and moisture through the body of the container and into the tree root ball itself, the tree root body may be provided with a plurality of holes 40 in the sides thereof.

Additionally, in order to facilitate the growth of the tree after it has been transplanted, the container body may be provided with a plurality of preferably triangular detachable portions 44 which are defined by weakened lines 46 and which also contain finger holes 48 to accommodate their removal. After the tree has been brought to the position where it is to be transplanted, the detachable portions 44 are removed from the container body, thereby leaving openings which permit the tree roots to extend readily through the container as the growth of the tree continues.

Thus it will be seen that the invention provides a relatively inexpensive and simple tree root container that may be readily and easily applied to a tree root ball for use in transplating operations. This type of container is obviously much easier to apply than cumbersome burlap sacks of the type heretofore used in the art of tree transplanting. Inasmuch as the container is formed of paperboard, it is, of course, bio-degradable and will in a relatively short period of time deteriorate completely within the ground.

We claim:

1. A unitary blank for forming a relatively rigid container to enclose the root formation of a tree or the like, wherein said root formation is in the form generally of a frustum of a cone, said unitary blank comprising:
   a. a plurality of foldably and radially connected segment-like panels, each segment-like panel being additionally defined by inner and outer chord lines of fold connected to each other at each end thereof;
   b. a closing panel connected to one of said segment-like panels and adapted to be secured to an opposite one of said segment-like panels to form a generally frusto-cone like figure in space;
   c. upper closing flaps foldably connected at the outer of said chord lines of said segment-like panels and adapted to be folded into substantially planar relationship;
      i. said upper closing flaps being adapted to receive a flexible strand for maintaining the first closing flaps in position after folding of said upper flaps;
   d. lower closing flaps foldably connected at the inner of said chord lines of said segment-like panels and adapted to be folded into substantially planar relationship;

i. said lower closing flaps including means thereon for locking the same in said planar relationship;

e. said segment-like panels having a portion defined by weakened lines with a finger aperture for readily removing said portion therefrom for facilitating the passage of growing tree root ends out of the container after the tree has been transplanted.

2. A relatively rigid container to enclose a root formation of a tree or the like, wherein said root formation is in the form generally of a frustum of a cone, said container being formed from a unitary blank of paperboard or the like, and comprising:
  a. a plurality of foldably and radially connected segment-like panels, each segment-like panel being additionally defined by inner and outer chord lines of fold connected to each other at each end thereof;
  b. a closing panel connected to one of said segment-like panels and secured to an opposite one of said segment-like panels forming a generally frusto-cone like figure in space;
  c. upper closing flaps foldably connected at the outer end of said chord lines of said segment-like panels and folded into substantially planar relationship over the upper surfaces of said root formation;
    i. said upper closing flaps receiving a flexible strand for maintaining the first closing flaps in position after folding of said upper flaps;
  d. lower closing flaps foldably connected at the inner of said chord lines of said segment-like panels and folded into substantially planar relationship over lower surfaces of said root formation;
    i. said lower closing flaps including means thereon for locking the same in said planar relationship;

e. said segment-like panels having a portion defined by weakened lines therein with a finger aperture for readily removing said portion therefrom, for facilitating the passage of growing tree root ends out of the container after the tree has been transplanted.

* * * * *